United States Patent
Kim et al.

(10) Patent No.: US 8,542,368 B2
(45) Date of Patent: Sep. 24, 2013

(54) POSITION MEASURING APPARATUS AND METHOD

(75) Inventors: Dae Ho Kim, Daejeon (KR); Tae-Gyu Kang, Daejeon (KR); Sang-Kyu Lim, Daejeon (KR); Il-Soon Jang, Daejeon (KR); You Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 27 days.

(21) Appl. No.: 13/310,598

(22) Filed: Dec. 2, 2011

(65) Prior Publication Data

US 2012/0154824 A1 Jun. 21, 2012

(30) Foreign Application Priority Data

Dec. 17, 2010 (KR) .................. 10-2010-0130172
May 23, 2011 (KR) .................. 10-2011-0048676

(51) Int. Cl.
*G01B 11/14* (2006.01)
(52) U.S. Cl.
USPC .......................................... 356/623
(58) Field of Classification Search
USPC ...................................... 356/623
See application file for complete search history.

(56) References Cited

U.S. PATENT DOCUMENTS 4,548,504 A * 10/1985 Morander ............... 356/623
6,480,289 B1 * 11/2002 Shimomura et al. ........ 356/614

FOREIGN PATENT DOCUMENTS

JP 2009-060181 A 3/2009

OTHER PUBLICATIONS

Shin Suzuki et al., "A Study on Processing of Position Detection and Data Communication Using Illuminant Devices and Image Sensor", Dept. of Computational Science and Engineering Nagoya University, 2000, p. 936-941, IEEE.

* cited by examiner

*Primary Examiner* — Tu Nguyen (57) ABSTRACT

A position measuring apparatus receives at least one precise position information set from at least one visible-light wireless communication device including a transmission light source, and upon receipt of the at least one precise position information ser, acquires a virtual distance based on the positions of transmission light sources imaged on an image sensor. Next, the position is measured according to the precise position information and the actual distance, virtual distance, and image sensor inclination based on this information.

14 Claims, 8 Drawing Sheets

POSITION MEASURING APPARATUS AND METHOD

CROSS-REFERENCE TO RELATED APPLICATION

This application claims priority to and the benefit of Korean Patent Application No. 10-2010-0130172 and 10-2011-0048676 filed in the Korean Intellectual Property Office on Dec. 17, 2010 and May 23, 2011, the entire contents of which are incorporated herein by reference.

BACKGROUND OF THE INVENTION (a) Field of the Invention

The present invention relates to a position measuring apparatus and method, and more particularly, to a position measuring apparatus and method using an image sensor.

(b) Description of the Related Art

In general, a global positioning system (GPS) is used to measure the position of an object. In a GPS method, the distance from a GPS satellite to a measurement object is calculated by receiving positioning information from the GPS satellite and measuring the time taken to receive the positioning information. The distance from one GPS satellite is equal at any location on the globe as far away as the GPS satellite. If three or more of such information, that is, trajectory information (longitude and latitude) and distance of three satellites are obtained, a point where virtual spheres formed by the three GPS satellites meet is created, and this point serves as the position of a measurement object. However, an error may occur in such GPS-based position information depending on the accuracy of positioning information provided by the GPS satellites and the accuracy of current time information required for calculating the distance from the GPS satellites. The error can be several tens of meters. Another disadvantage is that no GPS satellite signal can be received indoors.

To overcome these disadvantages, the position information of a base station to which a mobile terminal is connected or the position information of a connection in a wireless LAN such as WiFi may be used. However, one of the major drawbacks of such a position information service using radio waves is that it is difficult to provide three-dimensional position information. In other words, information about the presence of a measurement object in a certain building can be acquired; however, information about on which floor or in which room the object is located is hardly obtained. In order to overcome these disadvantages, a position measurement technique based on position information by using the visible light wireless communication technology has been proposed. In this case, position information about a measurement object may even include details like the floor, room, etc. of a building where the measurement object is placed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a position measuring apparatus and method that allow more accurate position measurement using the visible light wireless communication technology.

An exemplary embodiment of the present invention provides a position measuring method, which measures a position based on information provided from at least one communication device including a transmission light source, the method including: acquiring precise position information indicating a position of the transmission light source by capturing an image including an optical signal transmitted from the transmission light source; calculating an actual light source distance between transmission light sources based on the precise position information; calculating a virtual light source distance between the transmission light sources imaged on the image sensor from the captured image; measuring an inclination of the image sensor; and measuring the position based on the actual light source distance, the virtual light source distance, and the inclination.

The position measuring includes: calculating a first virtual light source distance between the transmission light sources imaged on the image sensor, and a second virtual light source distance corresponding to a parallel state of the image sensor based on the inclination; and calculating the position based on the second virtual light source distance, the actual light source distance, and the received precise position information regarding each transmission light source.

Another embodiment of the present invention provides a position measuring method, which measures a position based on information provided from at least one communication device including a transmission light source, the method including: acquiring precise position information indicating a position of the transmission light source by capturing an image including an optical signal transmitted from the transmission light source with an image sensor, the precise position information including coordinates along X and Y axes on a two-dimensional plane using the X and Y axes; if the precise position information is received from at least two transmission light sources, calculating an actual light source distance between the transmission light sources on each of the X and Y axes based on the precise position information; calculating a virtual light source distance between the transmission light sources on each of the X and Y axes, imaged on the image sensor, from the captured image; measuring an inclination of the image sensor along each of the X and Y axes; calculating a parallel virtual light source distance on each of the X and Y axes, corresponding a parallel state of the image sensor, based on the virtual light source distance and the inclination; and measuring a position of a measurement object on each of the X and Y axes based on the measured actual light source distance, parallel virtual light source distance, and inclination and the precise position information.

Yet another embodiment of the present invention provides a position measuring apparatus, which measures a position based on information provided from at least one communication device including a transmission light source, the apparatus including: a position information receiver that acquires precise position information indicating a position of the transmission light source by capturing an image including an optical signal transmitted from the transmission light source with a image sensor, the precise position information including coordinates along X and Y axes on a two-dimensional plane using the X and Y axes; an actual light source distance measuring unit that calculates an actual light source distance between transmission light sources on each of the X and Y axes based on the precise position information; a virtual light source distance measuring unit that calculates a virtual light source distance between the transmission light sources on each of the X and Y axes, imaged on the image sensor, from the captured image; an inclination measuring unit which measures an inclination of the image sensor along each of the X and Y axes; and a position information processing unit which measures a position of a measurement object on the X and Y axes based on an actual light source distance, virtual light source distance, and inclination measured for each of the X and Y axes and the precise position information.

The position information processing unit includes: a distance measuring module that calculates a parallel virtual light source distance for each of the X and Y axes, corresponding to the image sensor in a parallel state based on the virtual light source distance and the inclination, and calculates the first and second distances for each of the X and Y axes based on the parallel virtual light source distance, the first distance corresponding to a distance to a measurement position from the position of one transmission light source based on the precise position information, and the second distance corresponding to a distance to the measurement position from the position of another transmission light source based on the precise position information; and a position calculation module that measures the position of the object on the X and Y axes based on the first distance, the second distance, and the precise position information regarding the transmission light sources.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a position measuring apparatus and method according to an exemplary embodiment of the present invention will be described with reference to the accompanying drawings.

The position measuring apparatus and method according to the exemplary embodiment of the present invention, position measurement is carried out based on information provided from a wireless communication system using visible light.

Visible rays are rays having a wavelength in a range that is visible to a human eye. The wavelength of the visible rays corresponds to a wavelength of 380 to 780 nm. A change in nature according to the wavelength is represented by each color within the visible rays. The wavelength is shorter going from red to violet. Light having a wavelength longer than red is referred to as infrared rays and light having a wavelength shorter than violet is referred to as ultraviolet rays. In monochromatic light, red is shown at a wavelength of 700 to 610 nm, orange is shown at a wavelength of 610 to 590 nm, yellow is shown at a wavelength of 590 to 570 nm, green is shown at a wavelength of 570 to 500 nm, blue is shown at a wavelength of 500 to 450 nm, and violet is shown at a wavelength of 450 to 400 nm. Various colors can be represented by a mixture of colors having each wavelength.

Unlike ultraviolet rays or infrared rays, the visible rays are visible to a person. Lighting that radiates in the visible ray region should meet various requirements such as accurate color representation, or the like. A Small amount of flickering is one of the requirements. Since a human being cannot recognize flickering of 200 times or more per second, lighting using a light emitting diode (LED) having fast flickering performance controls flickering using pulse width modulation (PWM) in order to expand the lifespan of the LED while saving energy.

A communication technology using light in a communication area includes infrared-ray data wireless communication (IrDA) using an infrared-ray area, a visible-light wireless communication using visible light, optical communication using an optical fiber, etc. The infrared data communication is a technology for performing a communication by using an infrared-ray area having a wavelength of 850 to 900 nm. Visible-light wireless communication is a communication technology using a wavelength in the range of 380 to 780 nm.

Such wireless communication using visible light (hereinafter, referred to as "visible-light wireless communication") is a wireless communication technology using a visible light area having a wavelength of 380 to 780 nm, which is different from the wavelength used for infrared communication. Also, a position information service is provided. To this end, precise position information can be provided using LED lighting.

Figure 1:
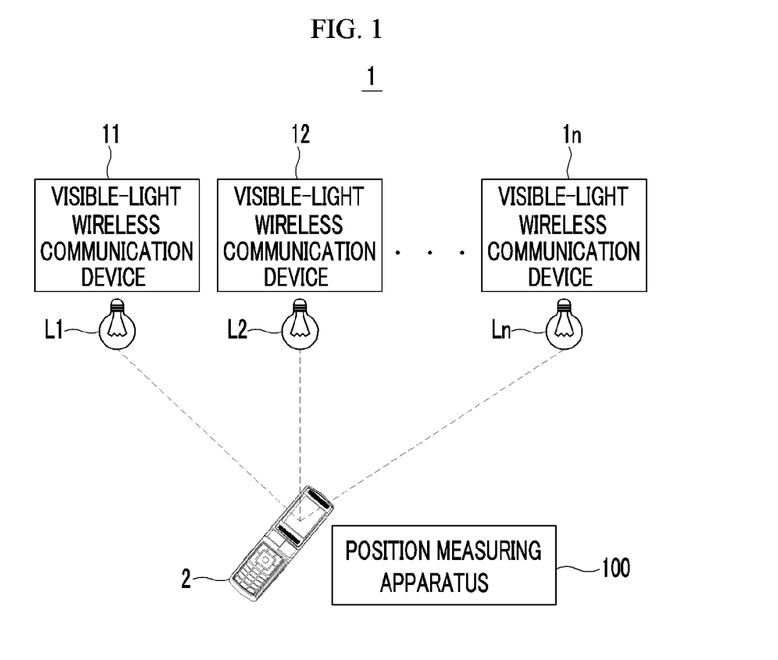
FIG. 1 is a view showing the concept of position information provision using visible-light wireless communication according to an exemplary embodiment of the present invention.

FIG. 1 is a view showing the concept of position information provision using visible-light wireless communication according to an exemplary embodiment of the present invention.

As shown in the attached FIG. 1, visible-light wireless communication devices 11, 12, . . . , 1n (n is a positive integer, and referred to by reference numeral 1 for convenience of description) can provide position information to a mobile terminal 2 including an image sensor (for example, a camera). In this case, the visible-light wireless communication device 1 includes a transmission light source L1, L2, . . . , Ln (n is a positive integer, and is referred by reference numeral L for convenience of description), and provides precise position information to the mobile terminal 2 by means of the transmission light source L. The precise position information is position information of the visible-light wireless communication device 1, and may include various kinds of position information, such as floor, a room number, and measurements in meters/centimeters/millimeters, as well as the latitude and longitude relative to the installation position of the visible-light wireless communication device 1. The precise position information provided from the transmission light source L of the visible light wireless communication device 1 can have a precision with which the distance between the transmission light sources can be measured in centimeters, more precisely, in millimeters.

An LED can be used as the transmission light source L. The LED includes a white (W) LED, a red (R) LED, a green (G) LED, a blue (B) LED, and so on.

The mobile terminal 2 receives the precise position information provided from the visible-light wireless communication device 1. To this end, the mobile terminal 2 receives the precise position information provided from the visible-light wireless communication device 1 by using an image sensor, and a position measuring apparatus 100 according to the exemplary embodiment of the present invention measures the position of the mobile terminal using the precise position information received by the mobile terminal and the inclination information of the mobile terminal obtained by itself. Although the position to be measured by the position measuring apparatus 100 is substantially the position of the mobile terminal in which the position measuring apparatus 100 is included, this position is measured based on the image sensor of the position measuring apparatus 100 and therefore the position to be measured can be represented by the position of the image sensor or the position of the mobile terminal.

The position measuring apparatus 100 receives signals transmitted from a plurality of transmission light sources by using the image sensor.

The image sensor captures the position information transmitted in the form of optical signals from the visible-light wireless communication devices 1 and outputs corresponding electrical signals. The image sensor may include a camera or the like. The acquisition of data, transmitted by the visible-light wireless communication device 1, from the electrical signals captured by the image sensor is a well-known art, so a detailed description thereof will be omitted.

For example, in the environment where the position measuring apparatus 100 is in communication with the plurality of visible-light wireless communication devices 1, as shown in FIG. 1, the positional relationship between two transmission light sources and the image sensor of the position measuring apparatus 100 will now be discussed.

Figure 2:
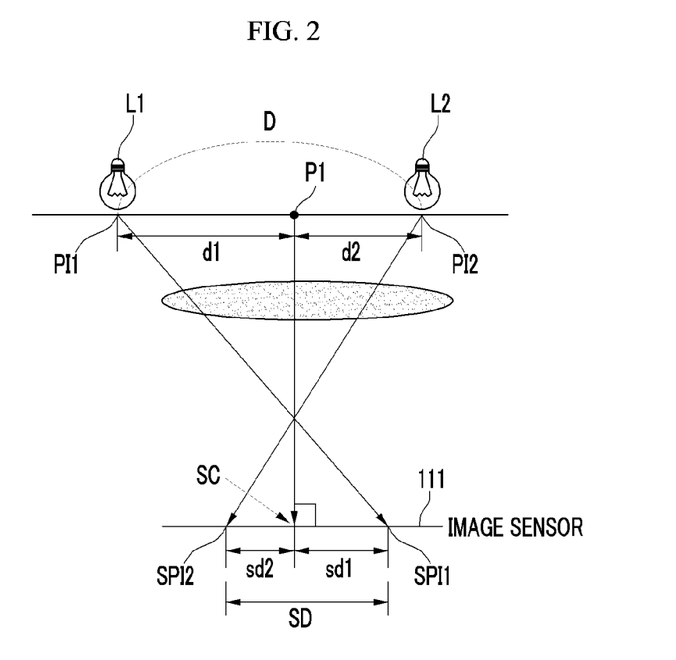
FIG. 2 is a view showing the positional relationship between the image sensor and the transmission light sources according to the exemplary embodiment of the present invention.

FIG. 2 is a view showing the positional relationship between the image sensor and the transmission light sources according to the exemplary embodiment of the present invention.

As shown in FIG. 2, an image sensor 111 of the position measuring apparatus 100 can receive precise position information from the two transmission light sources L1 and L2. In this case, for example, with respect to the axis on which the first transmission light source L1 and the second transmission light source L2 are located, the image sensor 111 is located at a position P1 which is spaced a first distance d1 away from the first transmission light source L1 and spaced a second distance d2 away from the second transmission light source L2. In this case, given that the actual distances, the first distance d1 and second distance d2, are known, the position of the image sensor can be measured based on the precise position information transmitted from the first transmission light source L1 and the precise position information transmitted from the second transmission light source L2. That is, given that the position of the first transmission light source L1 is PI1 and the position of the second transmission light source L2 is PI2, the actual position P1 of the image sensor 111 can be detected based on PI1+d1 or PI2−d2. The first distance d1 represents the actual distance from the actual position of one transmission light source to the actual position of the image sensor, and the second distance d2 represents the actual distance from the actual position of another transmission light source to the actual position of the image sensor. Herein, the distance between the position PI1 of the first transmission light source L1 and the position PI2 of the second transmission light source L2 is referred to as the actual light source distance.

In the exemplary embodiment of the present invention, in order to detect the first distance d1 and second distance d2 to the image sensor 111 with respect to the actual positions of the transmission light sources L1 and L2, the positions of the transmission light sources whose inverted images are formed on the image sensor 111 are used.

For example, as shown in FIG. 2, it is assumed that the transmission light sources L1 and L2 are located on the same axis (e.g., on a ceiling of a building), and the image sensor 111 of the position measuring apparatus 100 is located on an axis parallel to the axis on which the transmission light sources L1 and L2 are located. In this case, the image sensor 111 captures images of the transmission light sources L1 and L2 along with optical signals from the transmission light sources L1 and L2, and therefore inverted images of the transmission light sources L1 and L2 are formed on the image sensor 111. In other words, as shown in FIG. 2, the image of the first transmission light source L1 is formed at the position SPI1 on the image sensor 111, and the image of the second transmission light source L2 is formed at the position SPI2 on the image sensor 111. When the central point SC of the image sensor 111 corresponds to the actual position P1 of the image sensor 111, the first virtual distance sd1 and the second virtual distance sd2 can be acquired based on the positions SPI1 and SPI2 of the transmission light sources imaged on the image sensor 111. The first virtual distance sd1 is the distance between the position SPI1 of the first transmission light source, imaged on the image sensor 111, and the central point SC of the image sensor, and corresponds to the first distance d1. The second virtual distance sd2 is the distance between the position SPI2 of the second transmission light source, imaged on the image sensor 111, and the central point SC of the image sensor, and corresponds to the second distance d2. As described above, since the distance calculated based on the positions of the transmission light sources imaged on the image sensor is not the actual distance but the distance on the image sensor, it can be deemed as a virtual distance. For better comprehension and ease of description, the distance between the transmission light sources imaged on the image sensor is referred to as a "virtual light source distance". The virtual light source distance between the first transmission light source L1 and the second transmission light source L2 is indicated by "SD".

The first distance d1 and the first virtual distance sd1 are proportional to each other, and the second distance d2 and the second virtual distance sd2 are proportional to each other. Accordingly, the following conditions are met.

$$d1:d2=sd1:sd2$$

$$d1:d1+d2=sd1:sd1+sd2 \quad \text{[Equation 1]}$$

Herein d1+d2 can be calculated based on the precise position information about the actual positions PI1 and PI2 of the transmission light sources, and sd1 and sd2 can be calculated based on the positions SPI1 and SPI2 of the transmission light sources imaged on the image sensor 111. Accordingly, the value of d1 can be calculated from Equation 1 as follows.

$$d1 = (d1+d2) \times sd1/(sd1+sd2) \quad \text{[Equation 2]}$$

As d1, the first distance, can be calculated from the above Equation 2, d2, the second distance, can be calculated based on the calculated d1.

As the first distance d1 and the second distance d2 are acquired, the actual position P1 of the image sensor 111 can be detected from PI1+d1 or PI2−d2. The actual position P1 of the image sensor 111, as measured herein, represents the position on one axis. For example, it represents the position on the X axis. The actual position P1 of the image sensor 111 on the Y axis can also be measured through the above process.

Meanwhile, a distance on the image sensor can be converted into an actual distance. That is, it is possible to find out how far the pixel distance from the pixels of the images of the transmission light sources formed on the image sensor actually is. The distance (virtual distance) on the image sensor can be measured based on the pixel distance. The pixel distance includes a pixel size and a pixel interval.

As shown in FIG. 2, the virtual light source distance SD between the positions SPI1 and SPI2 of the transmission light sources imaged on the image sensor is proportional to the actual light source distance D depending on the precise position information PI1 and PI2 of the transmission light sources. Thus the virtual distance (unit virtual distance) between pixels can be calculated as follows.

$$\text{Unit virtual distance} = (d1+d2)/(sd1+sd2) \quad \text{[Equation 3]}$$

Based on the unit virtual distance, the virtual distance on the image sensor can be converted into an actual distance.

Meanwhile, the transmission light sources imaged on the image sensor may not be located on a straight line, as shown in FIG. 2, with respect to the central point SC of the image sensor.

Figure 3:
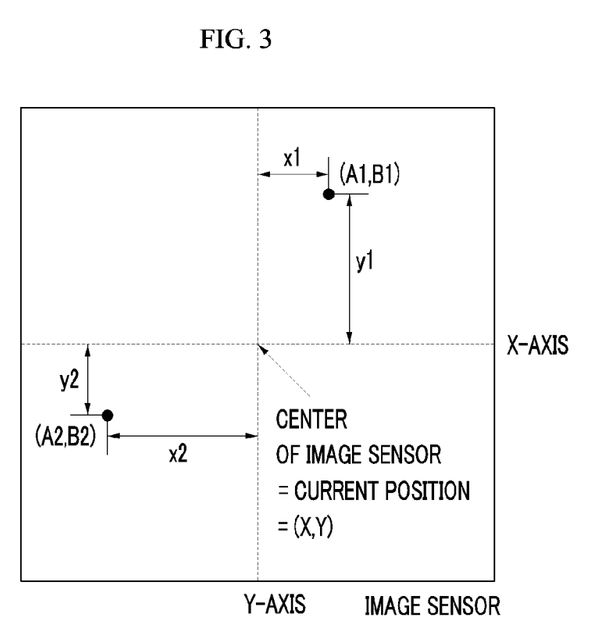
FIG. 3 is an illustrative diagram showing the positions of the transmission light sources imaged on the image sensor according to the exemplary embodiment of the present invention.

FIG. 3 is an illustrative diagram showing the positions of the transmission light sources imaged on the image sensor according to the exemplary embodiment of the present invention.

For example, as shown in FIG. 3, the transmission light sources imaged on the image sensor 111 may be located on different axes from each other relative to the central point SC of the image sensor 111. When the positions imaged on the image sensor are represented on a two-dimensional plane using the X axis and the Y axis as shown in FIG. 3, it is assumed that the coordinates of the central point SC of the image sensor 111 are (X, Y). In this case, the coordinates (X, Y) of the central point SC can correspond to the target position to be measured.

Let us suppose that the coordinates of the first transmission light source L1 is (A1, B1) and the coordinates of the second transmission light source L2 is (A2, B2), and the relationship of A1>A2 and B1>B2 is established. Also, let us suppose that the distance from the coordinates (A1, B1) of the first transmission light source L1 to the Y axis and the distance therefrom to the X axis are x1 and y1, respectively, and the coordinates (A2, B2) of the second transmission light source L2 to the Y axis and the distance therefrom to the X axis are x2 and y2, respectively.

In this state, the coordinates of the central point SC of the image sensor—i.e., current position (X, Y)—can be calculated as follows.

$$X = A1 - x1 = A2 + x2$$

$$Y = B1 - y1 = B2 + y2 \quad \text{[Equation 4]}$$

Herein x1, x2, y1, and y2 can be measured based on pixel distance, and then converted into actual distance based on unit virtual distance. That is, each of the virtual distances x1, x2, y1, and y2 are converted into actual distances based on the unit virtual distances, and the actual position corresponding to the coordinates (X, Y) of the central point of the image sensor can be measured based on the actual positions PI1 and PI2 of the transmission light sources respectively corresponding to the coordinates (A1, B1) of the first transmission light source L1 and the coordinates (A2, B2) of the second transmission light source L2 and the actual distances corresponding to the virtual distances x1, x2, y1, and y2.

The above-described method for measuring position on a two-dimensional plane with the X axis and the Y axis also applies to a three-dimensional plane. In this case as well, the axes along which the transmission light sources lie and the image sensor should be parallel to each other.

Meanwhile, a measurement object, for example, a mobile terminal, which is equipped with the image sensor, cannot always be kept parallel to the axis along which the transmission light sources are mounted. In other words, a measurement object may be inclined at a predetermined angle to the axis along which the transmission light sources are mounted.

Figure 4:
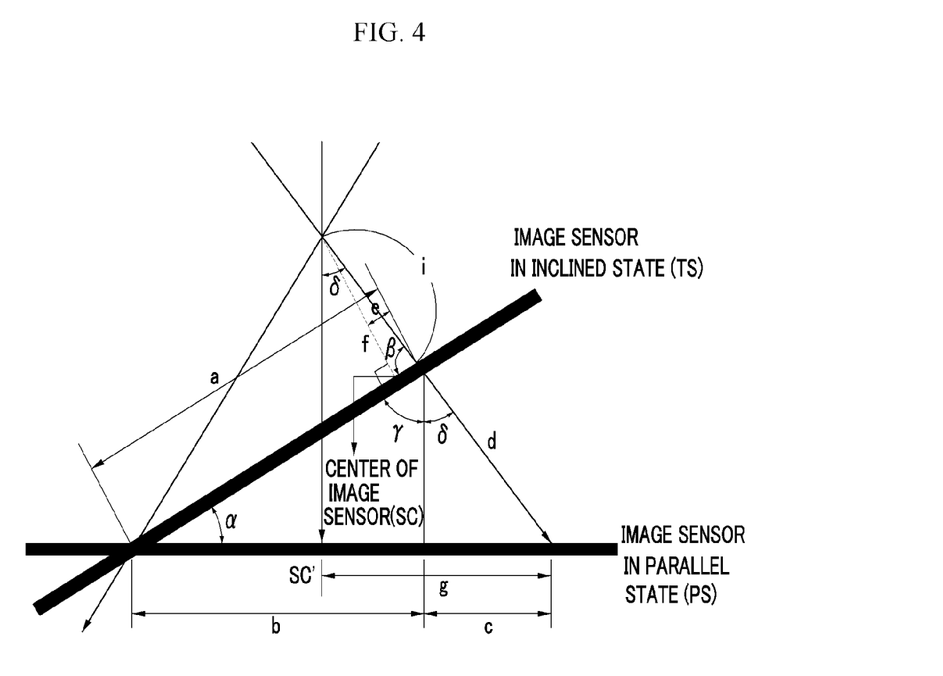
FIG. 4 is an illustrative diagram showing the image sensor being inclined at a predetermined angle to the transmission light sources according to the exemplary embodiment of the present invention.

FIG. 4 is an illustrative diagram showing the image sensor being inclined at a predetermined angle to the transmission light sources according to the exemplary embodiment of the present invention.

As illustrated in FIG. 4, the image sensor may be inclined at a predetermined angle while being parallel to the axis along which the transmission light sources are formed. Although FIG. 4 depicts the inclination toward only one axis, such inclination may occur along each of the X axis and the Y axis.

For example, if the image sensor is located inclined (TS) at a predetermined angle from the parallel state (PS), it is assumed that the image sensor is in the parallel state (PS) based on the distance between the transmission light sources obtained from the image captured by the image sensor in the inclined state (TS). Thus, the distance between the transmission light sources on the image captured by the image sensor in the parallel state can be taken into account. For better comprehension and ease of description, if the distance between the transmission light sources obtained from the image actually captured by the image sensor currently in the inclined state is referred to as a "first virtual transmission light source distance", the distance between the transmission light sources captured by the image sensor assumed to be in the parallel state may be referred to as a "second virtual light source distance".

The first and second virtual light source distances between the transmission light sources are in the relationship shown in FIG. 4.

The first virtual light source distance is measured upon receiving optical signals from the transmission light sources when the image sensor 111 of the position measuring apparatus 100 is in the inclined state (TS); however, an error occurs if the first virtual light source distance is used as it is. An error in units of pixel distance appears to be more serious when converted into actual distance. Therefore, in the exemplary embodiment of the present invention, such an error is compensated based on information on the inclination of the image sensor.

To this end, the second virtual light source b+c, which is the distance between the transmission light sources imaged on the image sensor in the parallel state (PS) is required. This is to acquire the virtual distance corresponding to the actual distance between the transmission light sources as shown in FIG. 2.

In order to calculate the second virtual light source distance b+c when the first virtual image light source distance a is acquired from the image captured by the image sensor in the inclined state (TS), the inclination α for the inclined state (TS) is measured, and the second virtual light source distance is calculated based on the measured inclination α. Meanwhile, if the central point SC of the image sensor is changed from the inclined state to the parallel state based on the inclination, it is placed at a predetermined position SC' as shown in FIG. 4. The distance between the central point SC' of the image sensor in the parallel state and a given transmission light source imaged on the image sensor in the parallel state can be referred to as "g". The "g" corresponds to the first virtual distance sd1 of FIG. 2. For convenience of description, g represents the first 1-1 virtual distance.

In FIG. 4, if a straight line perpendicular from the position of a certain transmission light source imaged on the image sensor in the inclined state (TS) to the image sensor in the parallel state (TS) is defined as virtual distance h, a right triangle having a virtual height h whose hypotenuse is the first virtual light source distance a is formed. The base of the right triangle is referred to as a virtual base b, and the following relationship is established using the right triangle.

$$b = a \times \cos \alpha$$

$$h = a \times \sin \alpha$$

$$\gamma = 90 - \alpha \qquad \text{[Equation 5]}$$

Herein α represents the angle of inclination of the image sensor 111, and corresponds to the angle between the hypotenuse a and the base b of the right triangle.

In the right triangle shown in FIG. 4, in order to know the angle between β and δ under the condition that the sum of β, γ, and δ is 180°, a right triangle whose height is the focal distance f of the image sensor in the inclined state (TS) and whose base angle is γ is formed, and the base of the right triangle is denoted by "e". Then, the following condition is met for β and δ.

$$\tan \beta = f/e \rightarrow \beta = \tan^{-1}(f/e)$$

$$\delta = 180 - \beta - \gamma = 180 - \beta - (90 - \alpha) = 90 - \beta + \alpha \qquad \text{[Equation 6]}$$

Through the above procedure, the angles β and δ are calculated. Thus, the angle of γ can be estimated based on the angles β and δ.

As the angle δ has been calculated, the value of c constituting the second virtual light source distance can be calculated as follows.

$$c = h \times \tan\delta = (a \times \sin\alpha) \times \tan\delta = (a \times \sin\alpha) \times \tan(90 - \beta + \alpha) \qquad \text{[Equation 7]}$$

Moreover, the 1-1 virtual distance g, which is the distance from the central point SC' of the image sensor in the parallel state to the transmission light source, is calculated. Specifically, the hypotenuse i can be obtained from a right triangle whose height is the focal distance f of the image sensor in the inclined state (TS), whose base angle is β, and whose base is "e", and the hypotenuse d can be obtained from a right triangle whose height is the virtual height h, whose base is "c", and which has one angle δ. Therefore, the base g, i.e., the 1-1 virtual distance, can be calculated from a right angle whose hypotenuse is i+d, whose height is k, whose base is g, and which has one angle δ.

Moreover, based on the first virtual light source distance a, which is the distance between the transmission light sources imaged on the image sensor in the inclined state (TS), and the inclination α of the image sensor, the second virtual light source distance between the transmission light sources on the image sensor assumed to be in the parallel state (PS) can be represented as follows.

$$\text{Second virtual light source distance } (b+c) = a \times \cos \alpha + \{(a \times \sin \alpha) \times \tan (90 - \beta + \alpha)\} \qquad \text{[Equation 8]}$$

As above, once the second virtual light source distance is acquired, the actual light source distance can be estimated based on the relationship between the distance (second virtual light source distance) between the transmission light sources on the image sensor and the actual distance between the transmission light sources as illustrated in FIG. 2. Specifically, the second virtual light source distance b+c and the 1-1 virtual distance g correspond to the virtual light source distance SD and the first virtual distance sd1, respectively, as shown in FIG. 2. Therefore, the second virtual distance sd2 can be calculated from the virtual light source distance SD and the first virtual distance sd1. Moreover, as the first distance d can be calculated by the above Equation 2 by using d1+d2, the first virtual distance sd1, and the second virtual distance sd2 acquired based on received precise position information, the second distance d2 can be calculated based on the calculated first distance d1. As the first distance d1 and the second distance d2 are acquired, the actual position P1 of the image sensor 111 in the environment as in FIG. 2 can be estimated from PI1+d1 or PI2−d2.

In the above description, every distance and inclination is represented along only one axis; however, in order to measure position on a two-dimensional plane including two axes, virtual distance, actual light source distance, and virtual light source distance, inclination, etc. along each axis (X axis and Y axis) have to be taken into consideration.

Figure 5:
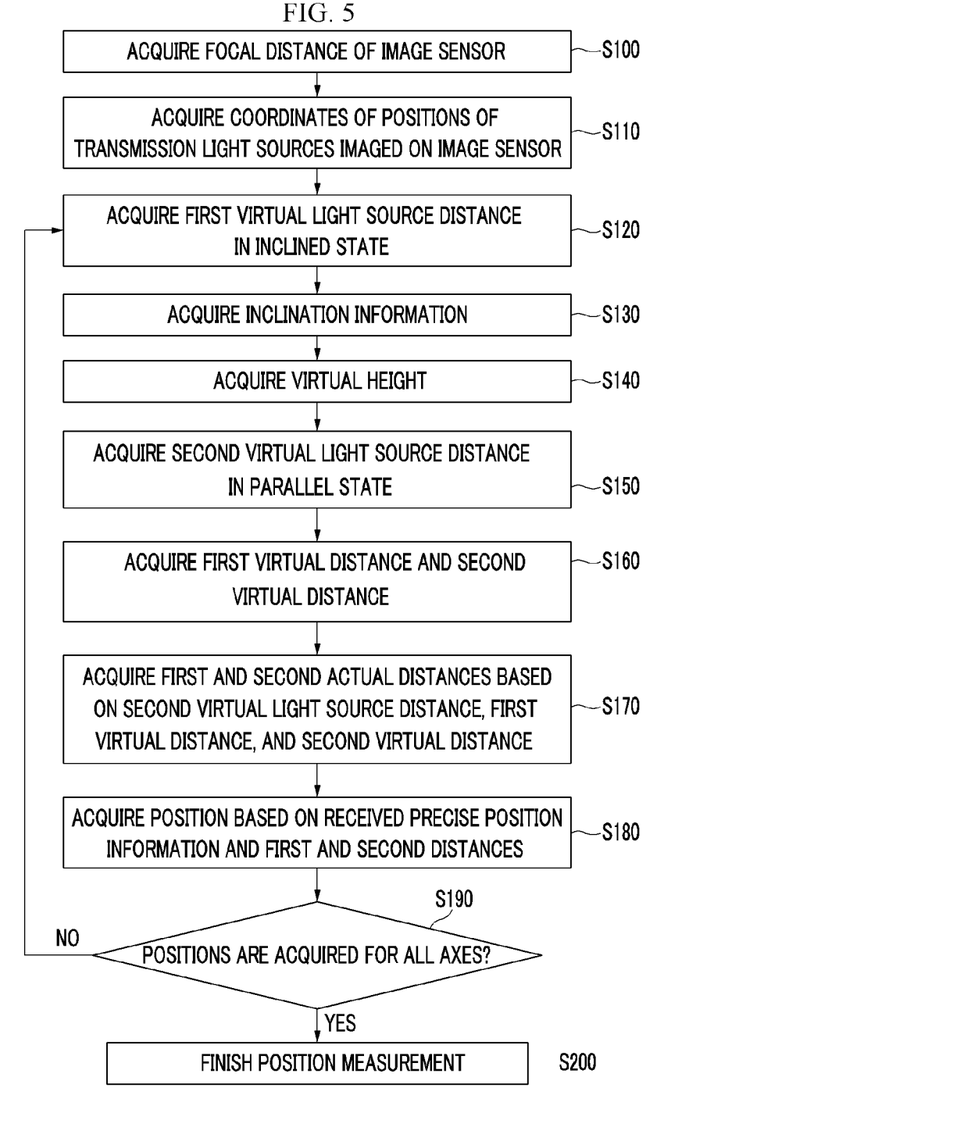
FIG. 5 is a flowchart of a position measuring method according to the exemplary embodiment of the present invention.

FIG. 5 is a view showing the flow of a position measuring method according to the exemplary embodiment of the present invention based on the above-described procedure.

As shown in FIG. 5, in order to measure the position of the image sensor, first of all, the position measuring apparatus 100 acquires the focal distance f of the image sensor 111 (S100). Next, virtual coordinates, which are the positions of the transmission light sources imaged on the image sensor 111, are acquired (S110).

The first virtual light source distance a on the image sensor in the inclined state is acquired based on the acquired virtual coordinates (S120), the inclination α of the image sensor is measured (S130), and the virtual height (h) is acquired (S140). Supposing that the image sensor is in the parallel state based on the virtual height h, the measured inclination α, and the first virtual light source distance a, the second virtual light source distance b+c is calculated (S150). The first virtual distance (sd1, g) and the second virtual distance sd2, which are the distances from the central point of the image sensor to the imaged transmission light sources are acquired based on the second virtual transmission light source b+c (S160).

Next, the first distance d1 and the second distance d2, which are the actual distances depending on the actual positions of the light sources, are calculated based on the second virtual light source distance b+c, the first virtual distance sd1, and the second virtual distance sd2 (S170). Then, the position of the image sensor is acquired based on the calculated first and second distances d1 and d2 and the actual positions of the transmission light sources according to the received precise position information (S180). For example, the X coordinate of the image sensor along the X axis or the Y coordinate of the image sensor along the Y axis are acquired.

Meanwhile, if the positions along both of the X and Y axes are acquired, position measurement is finished (S190, S200). Otherwise, the flow returns to the above step S120, and the steps S120 to S180 are repeatedly performed on an axis along which the position has not been acquired in order to acquire the position of the image sensor on the corresponding axis.

Through this procedure, the position, for example, X and Y coordinates, of the image sensor can be acquired.

Next, the structure of the position measuring apparatus according to the exemplary embodiment of the present invention will be described.

Figure 6:
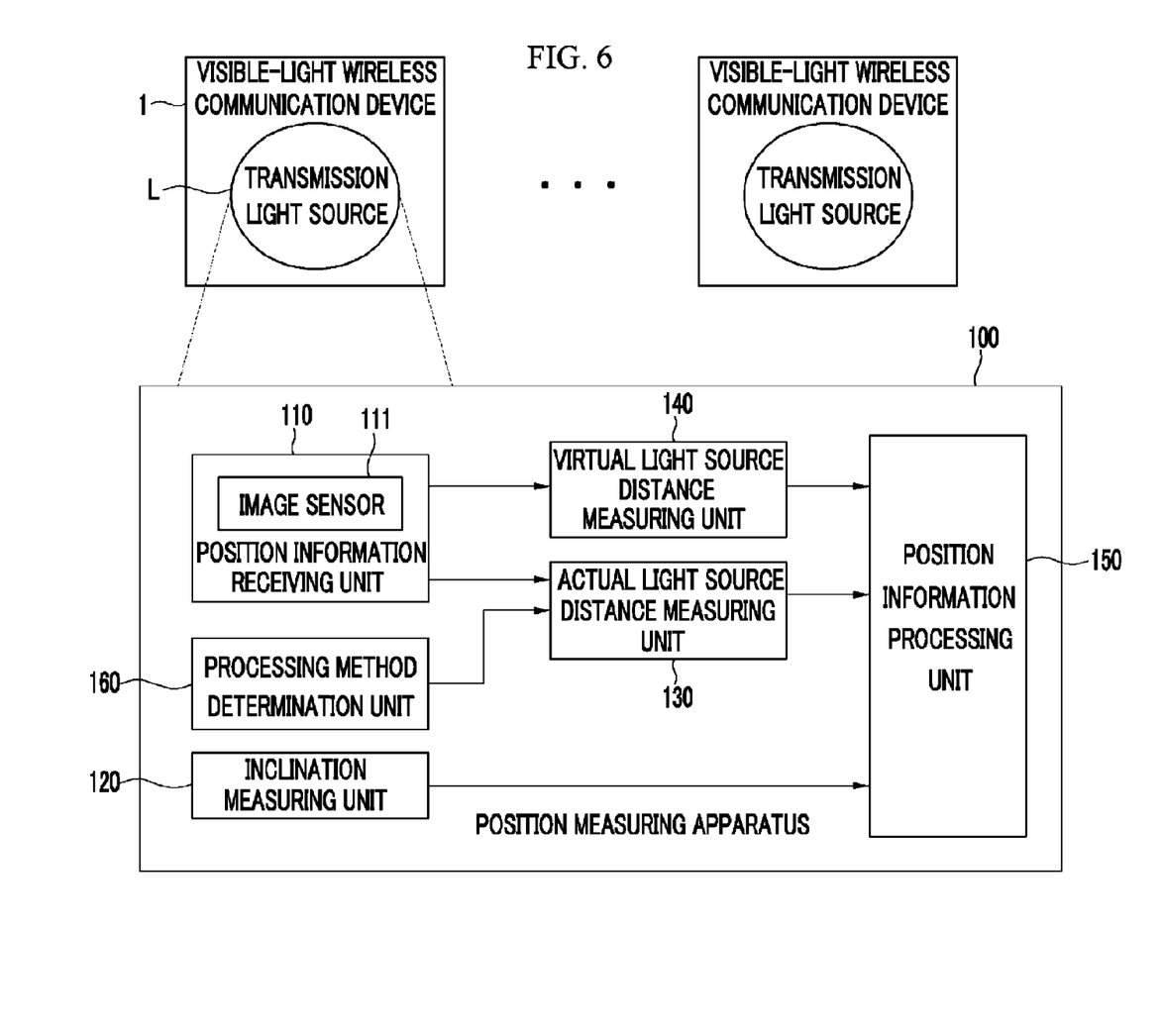
FIG. 6 is a schematic view showing the structure of the position measuring apparatus according to the exemplary embodiment of the present invention.
Figure 7:
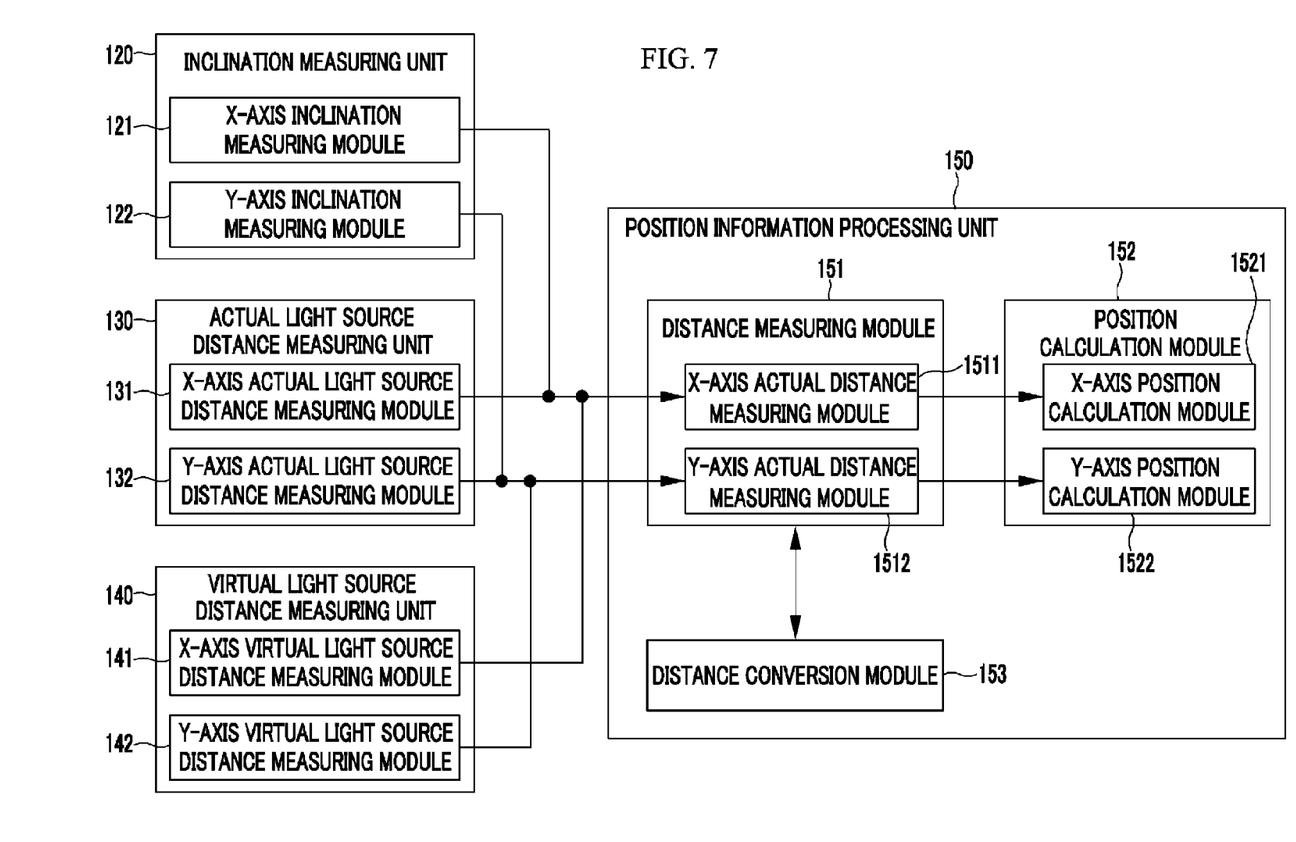
FIG. 7 is a detailed view showing the structure of the position measuring apparatus according to the exemplary embodiment of the present invention.

FIG. 6 is a schematic view showing the structure of the position measuring apparatus according to the exemplary embodiment of the present invention. FIG. 7 is a detailed view showing the structure of the position measuring apparatus according to the exemplary embodiment of the present invention.

As shown in FIG. 6, the position measuring apparatus 100 according to the exemplary embodiment of the present invention includes a position information receiving unit 110, an inclination measuring unit 120, an actual distance measuring unit 130, a virtual distance measuring unit 140, and a position information processing unit 150.

The position information receiving part 110 receives position information transmitted from a plurality of visible-light wireless communication devices 1. The position information receiving unit 110 includes an image sensor that captures the position information, i.e., precise position information, transmitted in the form of optical signals from the visible-light wireless communication devices 1, and outputs corresponding electrical signals.

The inclination measuring unit 120 measures the inclination of the position measuring apparatus 100. The exemplary embodiment of the present invention will be described by taking an example where the position measuring apparatus 100 is mounted on the mobile terminal 2. The inclination measuring unit 120 measures the inclination of the mobile terminal 2 on which the position measuring apparatus 100 is mounted; more specifically, the inclination of the image sensor 111. Since the image sensor 111 may be inclined relative to X and Y axes on a two-dimensional plane including the X and Y axes, the inclination along the X axis and the inclination along the Y axis are measured. To this end, as shown in FIG. 7, the inclination measuring unit 120 includes an X-axis inclination measuring module 121 and a Y-axis inclination measuring module 122. The inclination measuring unit 120 may include a two-axis inclination sensor.

The actual light source measuring unit 130 measures the actual light source distance between the transmission light sources based on the precise position information of the visible-light wireless communication devices transmitted from the transmission light sources. On the two-dimensional plane including the X and Y axes, the actual light source distance between the transmission light sources on the X axis and the actual light source distance between the transmission light sources on the Y axis are calculated based on the precise position information provided from the visible-light wireless communication devices. To this end, as shown in FIG. 7, the actual light source distance measuring unit 130 includes an X-axis actual light source distance measuring module 131 and a Y-axis actual light source distance measuring module 132.

The virtual light source distance measuring unit 130 measures the virtual light source distance between the transmission light sources imaged on the image sensor from the image captured by the image sensor 111 included in the position information receiving unit 110. That is, the positions (virtual position information) of the transmission light sources imaged on the image sensor are detected from the captured image, and the virtual distance between the transmission light sources captured on the image sensor is measured based on the distance between pixels of the image sensor. In this case as well, on the two-dimensional plane including the X and Y axes, the virtual light source distance between the transmission light sources on the X axis and the virtual light source distance between the transmission light sources on the Y axis are calculated based on the virtual position information acquired from the image. To this end, as shown in FIG. 7, the virtual light source distance measuring unit 140 includes an X-axis virtual light source distance measuring module 141 and a Y-axis virtual light source distance measuring module 142.

The position information processing unit 150 measures the current position based on the precise position information, the actual light source distance, inclination, and the virtual light source distance provided from the visible-light wireless communication devices. Although the current position to be measured herein is the current position of the image sensor 111, it ultimately refers to the position of an object (e.g., mobile terminal) on which the position measuring apparatus 100 is mounted.

As shown in FIG. 7, the position information processing unit 150 includes a distance measuring module 151, a position calculation module 152, and a distance conversion module 153.

The distance measuring module 151 measures the actual distance to the image sensor corresponding to a measurement position based on the inclination, the actual light source distance between the transmission light sources, and the virtual light source distance between the transmission light sources. Here, the actual distance represents the first distance d1 from a certain transmission light source to the image sensor and the second distance d2 from another transmission light source to the image sensor, as shown in FIG. 2, based on the actual positions of the transmission light sources. To measure the actual distance, the second light source distance, which is the virtual light source distance in the parallel state, is calculated based on the virtual light source distance (first virtual light source distance) provided from the virtual light source distance measuring unit 140 and the inclination provided from the inclination measuring unit 120 through the above procedure shown in FIG. 5. Next, the first virtual distance sd1 and the second virtual distance sd2 relative to the central point of the image sensor are calculated based on the second light source distance. Then, the first distance d1 and the second distance d2, which are the actual distances, are calculated based on the calculated first and second virtual distances sd1 and sd2 and the actual light source distance.

The distance measuring module 151 measures the actual distance along the X axis and the actual distance along the Y axis based on a two-axis plane. To this end, as shown in FIG. 7, the distance measuring module 151 includes an X-axis actual distance measuring module 1511 and an actual distance measuring module 1512.

The position calculation module 152 calculates the position of the image sensor, i.e., the position of a measurement object, based on the actual distance measured based on the received precise position information of transmission light sources and the virtual distance on the image sensor. In this case, the actual position on a given axis is calculated by adding or subtracting the actual distance to or from the actual position coordinates based on the received precise position information. By performing this procedure for each axis, the X coordinate of the actual position and the Y coordinate of the actual position are calculated. The thus-calculated X and Y coordinates correspond to the position of the measurement object. To this end, as shown in FIG. 7, the position calculation module 152 may include an X-axis position calculation module 1521 and a Y-axis position calculation module 1522.

The distance conversion module 153 converts virtual distance into actual distance; more specifically, converts measured virtual distance into actual distance by using a unit virtual distance based on a pixel distance on the image sensor.

Further, as shown in FIG. 6, the position measuring apparatus 100 according to the exemplary embodiment of the present invention may further include a processing method determination unit 160. The processing method determination unit 160 allows position measurement to be performed in different methods depending on the number of received position information sets. That is, a processing method is determined depending on the number of position information sets received from the transmission light sources. For example, if there is one received position information set, position measurement is performed based on the central point of the image sensor, the received precise position information, and the positions of the transmission light sources imaged on the image sensor.

On the other hand, if there are two or more position information, position measurement is performed without using the central point of the image sensor. That is, position measurement is performed based on the received precise position information and the positions of the transmission light sources imaged on the image sensor.

The method of performing position measurement without using the central point of the image sensor is referred to as the "first method", and the method of performing position measurement using the central point of the image sensor is referred to as the "second method".

If position measurement is performed according to the second method, the processing method determination unit 160 provides information on given coordinates of the central point of the image sensor to the virtual light source distance measuring unit 130, and calculates the virtual light source distance based on the central point of the image sensor and the positions of the transmission light sources imaged on the image sensor. Afterwards, the actual light source distance between the actual position according to the precise position information of the transmission light sources and a measurement position is measured based on the calculated virtual light source distance. In this case, the process for converting virtual distance into actual distance can be carried out. The conversion process may be carried out by using unit virtual distance, or by using a distance conversion table.

Next, a position measuring method according to another exemplary embodiment of the present invention will be described based on the above-described structure.

Figure 8:
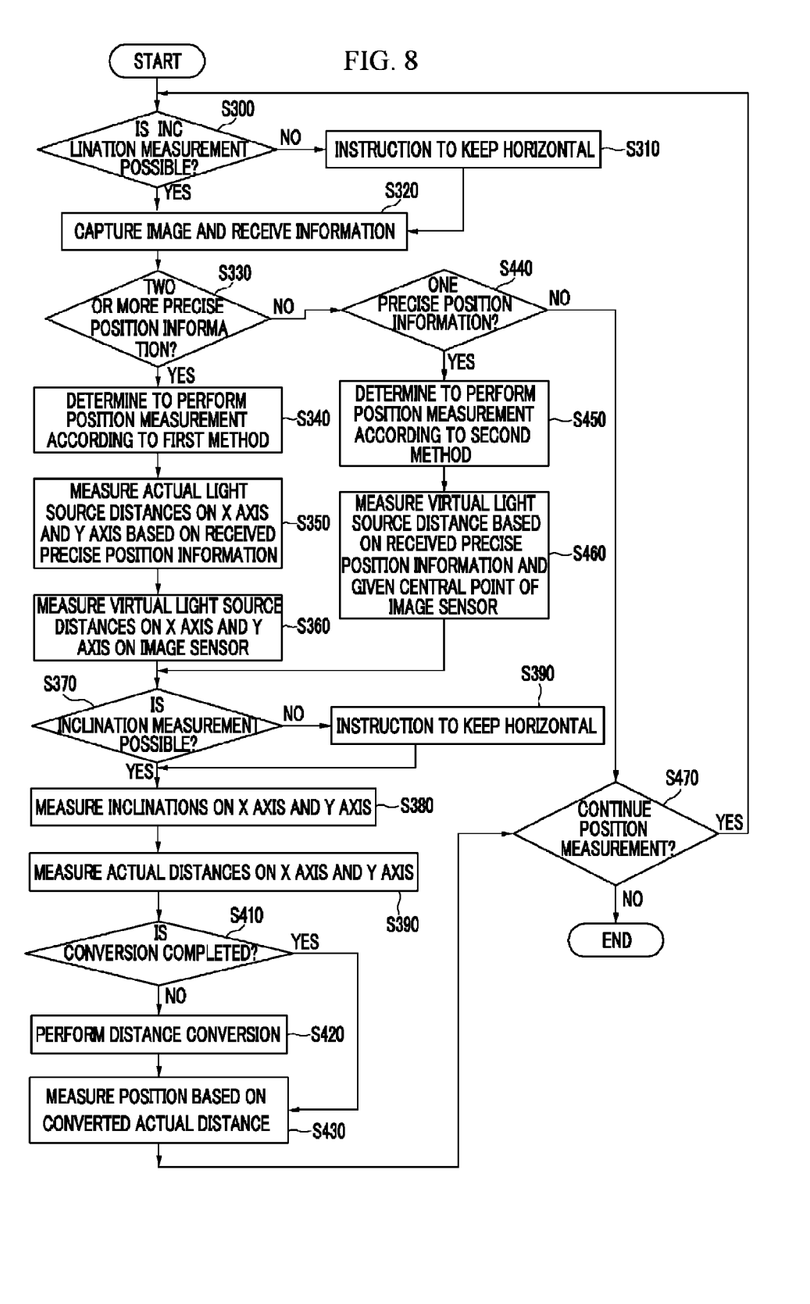
FIG. 8 is a position measuring method according to another exemplary embodiment of the present invention.

FIG. 8 is a position measuring method according to another exemplary embodiment of the present invention.

First of all, the position measuring apparatus 100 determines whether inclination measurement is possible before it performs position measurement (S300).

If inclination measurement is not possible, an alarm message for instructing the image sensor to be kept as horizontal as possible can be output in order to minimize an error in a measurement position (S310).

The position measuring apparatus 100 captures an image including an optical signal sent from a transmission light source L of a visible-light wireless communication device 1, and performs the processing of the captured image to acquire precise position information transmitted from the transmission light source L (S320).

The position measuring apparatus 100 determines if there are two or more precise position information sets acquired by this process (S330). If so, position measurement is performed according to the first method based on the acquired precise position information (S340).

When position measurement is performed according to the first method, the position measuring apparatus 100 calculates the actual light source distance on each of the X and Y axes based on the received precise position information of the transmission light sources (S350), and the virtual light source distance on each of the X and Y axes is calculated from an image captured by the image sensor (S360). Next, when an inclination occurs due to the movement of the mobile terminal on which the position measuring apparatus 100 is mounted, the state of the image sensor 11 changes. Thus, the inclination along each of the axis of the image sensor 111 and the Y axis is measured (S370 and S380). In this case, if inclination measurement is not possible, an alarm message for instructing the image sensor to be kept as horizontal as possible can be output in order to minimize an error in a measurement position (S390).

Afterwards, the actual distance to the image sensor corresponding to the measurement position is measured, as shown in FIG. 5, based on the actual light source distance, virtual light source distance, and inclination along each of the measured axis and the Y axis (S400).

The position of the mobile terminal is measured based on the thus-acquired actual distances (first distance d1 and second distance d2) to the image sensor along each of the X and Y axes and the precise position information of the transmission light sources.

In the exemplary embodiment of the present invention, to achieve more precise position measurement, it is determined whether the actual distance to the image sensor along each of the X and Y axes is a converted distance (S410). In other words, distance conversion may be required to compensate an error caused by the use of virtual distance because the actual distance is calculated using the virtual distance based on a pixel distance on the image sensor. If the measured actual distance has not been converted, the position measuring apparatus 100 performs conversion on the measured actual distance (S420). For example, if the virtual distance is a 15-pixel distance, it may be converted into an actual distance of 1 m by the conversion process. During this conversion process, a unit virtual distance according to the above Equation 3 may be used. Alternatively, the conversion may be performed using a given virtual/actual distance conversion table. This conversion process may be selectively performed.

The position measurement apparatus 100 measures the position of the mobile terminal based on the actual distances (first distance d1 and second distance d2) to the image sensor along each of the X and Y axes and the precise position information of the transmission light sources (S430).

Meanwhile, if there are less than two precise position information sets received in the step S330, the position measuring apparatus 100 determines whether the number of the precise position information sets is 1 (S450). If so, the position measuring apparatus 100 decides to measure position according to the second method (S460). When performing position measurement according to the second method, only one precise position information set about the transmission light sources is received, and therefore position measurement is performed based on given coordinates of the central point of the image sensor. The coordinates of the central point of the image sensor are predetermined. A virtual light source distance is measured based on the given coordinates of the central point of the image sensor (S460), and inclination measurement is performed, as described above, based on the measured virtual light source distance, followed by the subsequent processes. In this case, the virtual light source distance is calculated based on a given central point of the image sensor, and the second virtual light source distance corresponding to the image sensor in the parallel state is calculated based on the calculated virtual light source distance and the inclination. Rather than obtaining the first distance d1 and the second distance d2 based on the second light source distance as in the first method described above, the actual light source distance can be calculated directly based on the second virtual light source distance, and then the actual position of the mobile terminal can be measured from the precise position information of one transmission light source based on the actual light source distance. In this case also, the conversion of virtual distance into actual distance can be carried out. The conversion process may be carried out by using unit virtual distance, or by using a pre-created distance conversion table.

After the position measurement, the position measurement may continue optionally (S470). Otherwise, the position measurement is completed.

According to these exemplary embodiments of the present invention, the position of a measurement object can be measured more accurately based on the precise position information of transmission light sources received from a visible-light wireless communication device, the actual light source distance based on this information, and the virtual light source distance of the transmission light sources imaged on the image sensor.

The order of the steps of the position measuring method of FIG. 8 is merely an example, and this order may be changed in some cases.

According to an exemplary embodiment of the present invention, in the case of position measurement using a visible-light wireless communication technology, position can be measured more accurately by using information provided from the visible-light wireless communication device, information on the image sensor, and inclination information.

Moreover, the position of a mobile terminal, such as a smartphone equipped with an image sensor and an inclination sensor, can be measured without the use of additional parts.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A position measuring method, which measures a position based on information provided from at least one communication device including a transmission light source, the method comprising:
    acquiring precise position information indicating a position of the transmission light source by capturing an image including an optical signal transmitted from the transmission light source;
    calculating an actual light source distance between transmission light sources based on the precise position information;
    calculating a virtual light source distance between the transmission light sources imaged on the image sensor from the captured image;
    measuring inclination of the image sensor; and
    measuring a position based on the actual light source distance, the virtual light source distance, and the inclination,
    wherein the position measuring comprises:
    calculating a first virtual light source distance between the transmission light sources imaged on the image sensor, and a second virtual light source distance corresponding to a parallel state of the image sensor based on the inclination; and
    calculating the position based on the second virtual light source distance, the actual light source distance, and the received precise position information about each transmission light source.

2. The method of claim 1, wherein the position calculating comprises:
    calculating a first virtual distance to one transmission light source imaged on the image sensor from a central point of the image sensor based on the second virtual light source distance;
    calculating a second virtual distance to another transmission light source imaged on the image sensor from the central point of the image sensor based on the second virtual light source distance; and
    calculating the position based on the first virtual distance, the second virtual distance, the actual light source distance, and the precise position information.

3. The method of claim 2, wherein, in the position calculating, the position is calculated based on the first virtual distance and the second virtual distance that are proportional to a first distance and a second distance, the first distance corresponding to a distance from a position of one transmission light source to a position to be measured based on the precise position information, and the second distance corresponding to a distance from a position of another transmission light source to the position to be measured based on the precise position information.

4. The method of claim 3, wherein the position calculating comprises:
    calculating the first distance based on a condition d1=(d1+d2)×sd1/(sd1+sd2) (where d1 represents the first distance, d2 represents the second distance, sd1 represents the first virtual distance, and sd2 represents the second virtual distance); and
    calculating the position according to the position of one transmission light source based on the precise position information and the first distance.

5. The method of claim 4, wherein, if the position of one transmission light source based on the precise position information is a coordinate x1 on an X axis, a coordinate of the position to be measured corresponds to a coordinate of x1+ the first distance.

6. The method of claim of claim 1, wherein, if the position is measured on a two-dimensional plane using X and Y axes, the precise position information comprises coordinates along the X and Y axes, and
    X-axis and Y-axis coordinates of the measurement position are obtained by performing, for each of the X and Y axes, the acquiring of precise position information, the calculating of an actual light source distance, the calculating of a virtual light source distance, the measuring of an inclination, and the measuring of a position.

7. A position measuring method, which measures a position based on information provided from at least one communication device including a transmission light source, the method comprising:
- acquiring precise position information indicating a position of the transmission light source by capturing an image including an optical signal transmitted from the transmission light source with an image sensor, the precise position information including coordinates along X and Y axes on a two-dimensional plane using the X and Y axes;
- if the precise position information is received from at least two transmission light sources, calculating an actual light source distance between the transmission light sources on each of the X and Y axes based on the precise position information;
- calculating a virtual light source distance between the transmission light sources on each of the X and Y axes, imaged on the image sensor, from the captured image;
- measuring inclination of the image sensor along each of the X and Y axes;
- calculating a parallel virtual light source distance on each of the X and Y axes, corresponding a parallel state of the image sensor, based on the virtual light source distance and the inclination; and
- measuring a position of a measurement object on each of the X and Y axes based on the measured actual light source distance, parallel virtual light source distance, the inclination, and the precise position information.

8. The method of claim 1, wherein the position measuring comprises:
- calculating a first virtual light source distance to one transmission light source imaged on the image sensor from a central point of the image sensor along each of the X and Y axes based on the parallel virtual light source distance;
- calculating a second virtual distance to another transmission light source imaged on the image sensor from the central point of the image sensor along each of the X and Y axes based on the parallel virtual light source distance;
- calculating a first distance and a second distance for each of the X and Y axes based on the first and second virtual distances, the first distance corresponding to a distance to a measurement position from a position of one transmission light source based on the precise position information, and the second distance corresponding to a distance to the measurement position from a position of another transmission light source based on the precise position information; and
- measuring a position of the object on the X and Y axes based on the first distance, the second distance, and the precise position information regarding the transmission light sources.

9. The method of claim 2, further comprising:
- converting the first and second distances into actual distances,
- wherein, in the position measuring, the position is measured using the converted first and second distances.

10. A position measuring apparatus, which measures a position based on information provided from at least one communication device including a transmission light source, the apparatus comprising:
- a position information receiver that acquires precise position information indicating a position of the transmission light source by capturing an image including an optical signal transmitted from the transmission light source with an image sensor, the precise position information including coordinates along X and Y axes on a two-dimensional plane using the X and Y axes;
- an actual light source distance measuring unit that calculates an actual light source distance between transmission light sources on each of the X and Y axes based on the precise position information;
- a virtual light source distance measuring unit that calculates a virtual light source distance between the transmission light sources on each of the X and Y axes, imaged on the image sensor, from the captured image;
- an inclination measuring unit that measures an inclination of the image sensor along each of the X and Y axes; and
- a position information processing unit that measures a position of a measurement object on the X and Y axes based on an actual light source distance, a virtual light source distance, and inclination measured for each of the X and Y axes and the precise position information,
- wherein the position information processing unit calculates a parallel virtual light source distance for each of the X and Y axes, corresponding to a parallel state of the image sensor, based on the virtual light source distance and the inclination, and calculates the position based on the parallel virtual light source distance, the actual light source distance, and the precise position information about each transmission light source.

11. The apparatus of claim 10, wherein the position information processing unit comprises:
- a distance measuring module that calculates the parallel virtual light source distance for each of the X and Y axes, corresponding to the parallel state of the image sensor, based on the virtual light source distance and the inclination, and calculates a first distance and a second distance for each of the X and Y axes based on the parallel virtual light source distance, the first distance corresponding to a distance to a measurement position from a position of one transmission light source based on the precise position information, and the second distance corresponding to a distance to the measurement position from a position of another transmission light source based on the precise position information; and
- a position calculation module that measures a position of the object on the X and Y axes based on the first distance, the second distance, and the precise position information regarding the transmission light sources.

12. The apparatus of claim 11, wherein the position calculation module calculates the position based on the fact that the first and second virtual distances calculated based on the parallel virtual light source distance are proportional to the first and second distances, the first virtual distance corresponding to a distance to the one transmission light source imaged on the image sensor from the central point of the image sensor, and the second distance corresponding to a distance to the another transmission light source imaged on the image sensor from the central point of the image sensor.

13. The apparatus of claim 11, wherein the position information processing unit further comprises a distance conversion module for converting the first and second distances into actual distances.

14. The apparatus of claim 10, further comprising a processing method selection unit that selects either a first method or a second method depending on a number of the received precise position information sets,
- wherein the first method is to measure position based on the received precise position information, and the second method is to measure position using the received precise position information and a given central point of the image sensor.

* * * * *